United States Patent [19]

Scola

[11] 4,056,651
[45] Nov. 1, 1977

[54] MOISTURE AND HEAT RESISTANT COATING FOR GLASS FIBERS

[75] Inventor: Daniel A. Scola, Glastonbury, Conn.

[73] Assignee: United Technologies Corporation, Hartford, Conn.

[21] Appl. No.: 706,025

[22] Filed: July 16, 1976

Related U.S. Application Data

[63] Continuation-in-part of Ser. No. 559,480, March 18, 1975, abandoned.

[51] Int. Cl.² .................. B32B 17/04; B32B 27/26; B32B 17/10
[52] U.S. Cl. .................................. 428/336; 428/375; 428/391; 428/392; 428/378; 428/395; 428/429; 428/435
[58] Field of Search ............... 428/395, 392, 435, 902, 428/429, 391, 375, 378, 336

[56] References Cited

U.S. PATENT DOCUMENTS

| | | | |
|---|---|---|---|
| 3,179,633 | 4/1965 | Endrey | 428/422 |
| 3,249,411 | 5/1966 | McWilliams | 428/392 |
| 3,371,009 | 2/1968 | Traynor | 428/251 |
| 3,616,196 | 10/1971 | Dun | 428/435 |
| 3,654,227 | 4/1972 | Dine-Hart | 428/443 |
| 3,697,345 | 10/1972 | Vaughan | 428/435 |
| 3,755,061 | 8/1973 | Schurf | 428/902 |
| 3,924,047 | 12/1975 | Ward | 428/378 |

Primary Examiner—Ellis Robinson
Attorney, Agent, or Firm—John D. Del Ponti

[57] ABSTRACT

A moisture and heat resistant finish coating for materials having a hydroxylated surface such as glass fibers embeddable in a resin matrix composite consisting essentially of approximately, by weight, 40-98 percent of a polyimide film former, 2-60 percent of a silane coupling agent and up to 30 percent of a wetting and lubricating agent.

6 Claims, 4 Drawing Figures

MOISTURE AND HEAT RESISTANT COATING FOR GLASS FIBERS

The invention herein described was made in the course of or under a Contract or Subcontract thereunder with the Department of the Army.

BACKGROUND OF THE INVENTION

This is a continuation-in-part of U.S. patent application Ser. No. 559,480 filed Mar. 18, 1975, now abandoned.

The present invention relates to a moisture and heat resistant coating for glass fibers and more particularly to a moisture and heat resistant finish coating for glass fibers comprising a mixture of a polyimide film former, a silane coupling agent and a wetting/lubricating agent.

In general, there are two major problems inhibiting successful usage of state-of-the-art composite materials made of resin reinforced with glass fibers such as glass-/epoxy, glass/polyester and glass/polyimide. One of these problems is the occurrence of a slow decrease in mechanical properties, particularly in shear and flexural strength, which is exhibited after exposure to humid atmospheres for extended periods of time — up to 5 years. This loss in mechanical strength on ambient aging reduces the reliability of any system containing these materials, particularly those which may require long time storage before use.

Although the prior art has used various starches, silanes and plastic materials as coatings in an effort to remedy the aforesaid deterioration, efforts have been less than successful. The coatings have been applied to glass fibers both from aqueous solutions and from organic solutions but, until the present invention, the fibers have not been able to consistently retain more than approximately 80 percent of their tensile strength after exposure to humid conditions or boiling water vapors.

The other major problem facing present day glass-resin composites is that of degradation after exposure to elevated temperatures of 500° F and higher.

SUMMARY OF THE INVENTION

The present invention, in general, contemplates a moisture and heat resistant finish coating for objects having a hydroxylated surface and, more particularly, for glass fibers which are embeddable in a resin matrix. The finish coating contains as essential ingredients at least one polyimide film former and at least one coupling agent. In one embodiment, there is included, by weight, approximately, 40 –98 percent, preferably 45 –95 percent, of a polyimide film former. The term "polyimide film former", for the purposes of the present invention is defined to mean a resin material which, when applied as a solution to a surface, spreads out into a continuous film and, when the solvent evaporates, leaves a nonporous film coating and which resin material is selected from the group consisting of (1) a fully imidized and polymerized polyimide containing the repeating unit

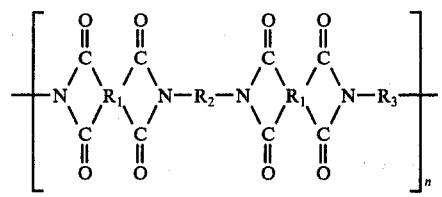

wherein $R_1$ is a tetravalent radical selected from the group consisting of

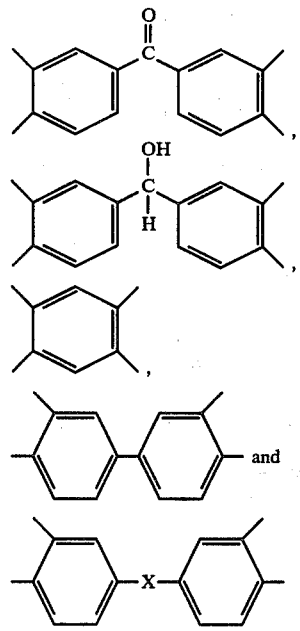

wherein X = O, S, $SO_2$, $CH_2$,

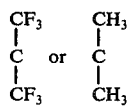

and $R_2$ is a divalent aromatic or aliphatic radical selected from the group consisting of

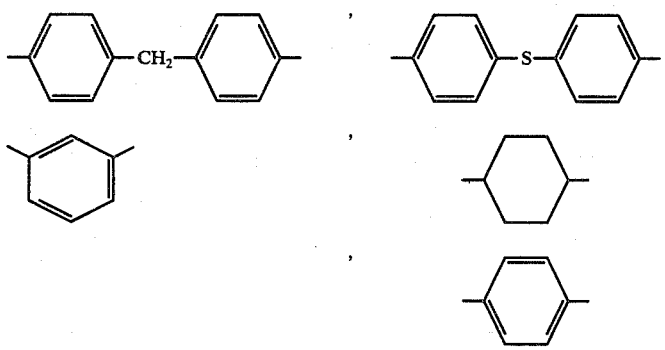

-continued

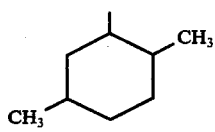 , 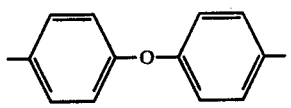 ,

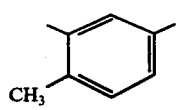 , 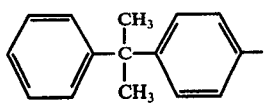

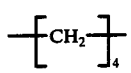 and 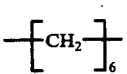

and R₃ is an aromatic divalent radical selected from the group consisting of

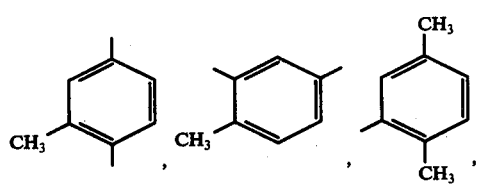

and

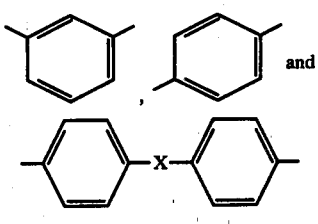

where X = CH₂, O, S or

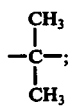

(2) an addition type resin intermediate derived from the low molecular weight polyimide monomer

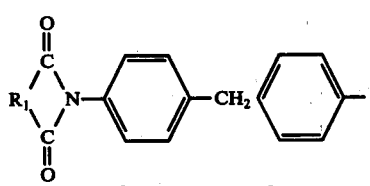

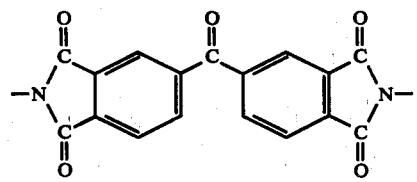

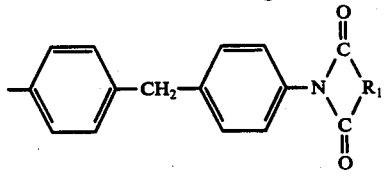

wherein R₁ is an unsaturated divalent system such as

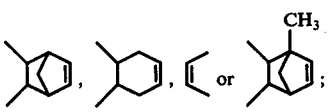

and (3) an hydroxylated high molecular weight aromatic polyimide in the amic acid stage having the repeating unit

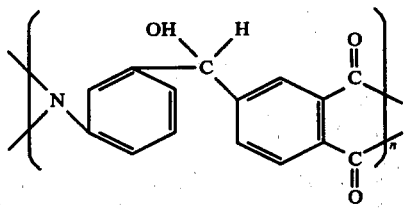

wherein n is an integer of sufficient magnitude, e.g., at least approximately 5, to provide a polymer with film forming capability. Suitable examples of polyimide film formers include (1) Upjohn's 2080 polyimide, (2) Rhone-Poulenc's polyimide Nolimide 605, and (3) the polyimide derived from the monomers 5-norbornene-2,3-dicarboxylic acid monomethyl ester, 4,4'-methylenedianiline, and 3,3'-4,4'-benzophenonetetracarboxylic acid dimethyl ester in a molar ratio of 1:1:0.5, respectively.

The other essential ingredient is, by weight, 2–60 percent, preferably 4–40 percent of a silane coupling agent to provide improved adhesion by reacting both with the hydroxylated surface and the resin to provide a substantially permanent bond. Silane coupling agents considered suitable are characterized by the formula $$R - Si - X_3$$

wherein R is an organic group containing amino, epoxy, aminehydrochloride or carboxy functionality such as

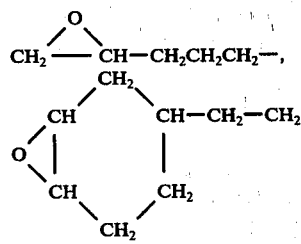

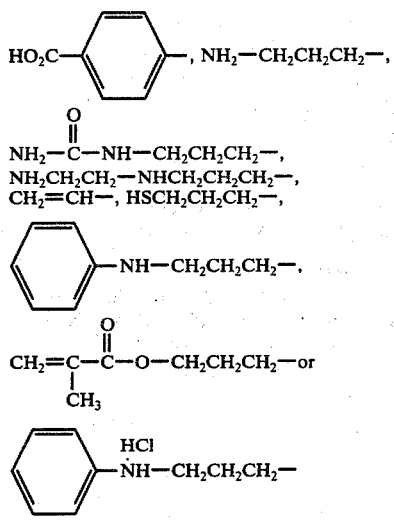

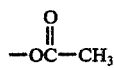

and X is an organic group which contains ether or ester functionality such as —OCH₃, —OCH₂CH₃, $$-O\overset{O}{\overset{\|}{C}}-CH_3$$

or —OCH₂CH₂OCH₃. Suitable coupling agents include (1) β-(3,4-epoxy cyclohexyl) ethyltrimethoxysilane available from Union Carbide as A-186, (2) γ-glycidoxy- propyltrimethoxysilane available from Union Carbide as A-187, γ-N-ureidopropyltriethoxysilane available from Union Carbide as Y-5650, p-carboxyphenylpolysiloxane available from Dow Corning as XZ-8-5041 and γ-aminopropyl- trimethoxysilane hydrochloride available from Dow Corning as XZ-8-5073.

Although not essential, up to approximately 30 percent, by weight, preferably 2–25 percent, of a wetting and lubricating agent may be applied to the hydroxylated surface with the aforementioned film formers and coupling agents. This is particularly so in the case of glass fibers which are to be further processed and which can therefore benefit most from the added lubricity imparted. Suitable wetting/lubricating agents are selected from the group consisting of (1) n-vinylpyrrolidone base polymers having the structure

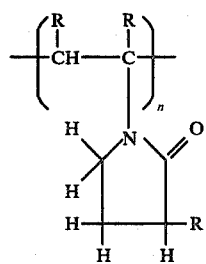

wherein R is H or an alkyl group and n is an integer of sufficient magnitude to give a molecular weight ranging from 7,000 to 20,000, such as those commercially available Ganex polymers V-220, V516 and V-816 and (2) non-ionic silicone compounds having the general formula

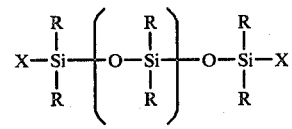

wherein R is selected from the group consisting of methyl, ethyl, phenyl and hydrogen, X is selected from the group consisting of amine, methoxy or R and n is an integer from 10 to 20. Suitable silicones are amine end blocked dimethyl silicon fluid, amine end blocked diethyl silicon fluid, amine end blocked diphenyl silicon fluid, methoxy end blocked dimethyl silicon fluid, methoxy end blocked diethyl silicon fluid, methoxy end blocked diphenyl silicon fluid, methyl end blocked dimethyl silicon fluid (sold by Union Carbide as L-77), methyl end blocked diethyl silicon fluid and methyl end blocked diphenyl silicon fluid. Union Carbide's non-ionic liquid silicone fluid A-1701 is a suitable wetting-/lubricating agent falling within the above definition.

The coating of the present invention, when present at a thickness of approximately 0.02–25 μ, preferably 0.05–0.20 μ, acts as a finish to prevent moisture and elevated temperature degradation of glass fibers and to prevent fiber-fiber abrasion. Glass fibers provided with the inventive finish coating find particular utility as reinforcement in the high temperature resins such as epoxy, polyimide, epoxy-polyimide, phenolic, polyquinoxaline, polyphenylquinoxaline and polyimadazoquinazoline and the like. As previously indicated, the finish coating is suitable not only for providing a moisture and heat resistant finish coating for glass fibers such as S-glass or E-glass but for providing such a finish coating for any material with a hydroxylated or oxygen-containing surface such as alumina, carbon or graphite, whether or not in fiber form. By heat resistant is meant the capability of continuous operation at elevated temperatures, as for example, the capability of composites reinforced with fibers having the inventive finish, to withstand temperatures of 550° F while retaining at least 80 percent of their shear strength properties. By moisture resistant is meant the capability of withstanding exposure to humid conditions or boiling water, as for example the capability of glass rovings having the inventive finish to withstand exposure to boiling water vapors for 24 hours and 95 percent relative humidity for 8 weeks at 120° F while retaining at least 80 percent of their tensile strength properties and the capability of composites reinforced with glass rovings having the inventive finish to withstand 24 hours in boiling water or exposure to 95 percent relative humidity for 8 weeks at 120° F while retaining at least 80 percent of their shear strength properties.

BRIEF DESCRIPTION OF THE DRAWINGS

An understanding of the invention will become more apparent to those skilled in the art by reference to the following detailed description when viewed in light of the accompanying drawings wherein.

DESCRIPTION OF THE PREFERRED EMBODIMENT

The inventive coating comprises a polyimide film former, a silane coupling agent and, if desired, a wetting/lubricating agent which, in unique combination, gives a finish coating which prevents fiber-fiber abrasion, bonds to the fiber and the resin matrix and prevents deterioration by moisture as well as by elevated temperatures up to approximately 550° F. The coating may be applied immediately after glass fiber formation or at a subsequent time such as after weaving and heat cleaning.

As described hereinabove, film formers considered useful are those resin materials which form continuous polyimide films over the surface of the glass filament. As indicated, examples of polyimide film formers are Upjohn's 2080 polyimide, Rhone-Poulenc's polyimide Nolimide 605, and the polyimide derived from the monomers 5-norbornene-2,3-dicarboxylic acid monomethyl ester (NE, also called Nadic Anhydride Monomethyl Ester), 4,4'-methylenedianiline (MDA), and 3,3'-4,4'-benxophenonetetracarboxylic acid dimethyl ester (BTDE) in a molar ratio of 1:1:0.5, respectively, all of which polymerize to polyimide films on heating.

Coupling agents useful in the present invention are preferably selected from the group consisting of β-(3,4-epoxy cyclohexyl) ethyltrimethoxysilane (A-186), γ-glycidoxypropyltrimethoxysilane, (Union Carbide's A-187 or Dow Corning's Z-6040), γ-N-ureidopropyltriethoxysilane (Union Carbide's Y-5650), p-carboxyphenylpolysiloxane (Dow Corning's XZ-8-5041) and γ-aminopropyltrimethoxy- silane hydrochloride (Dow Corning's XZ-8-5073). As will be appreciated by those skilled in the art, small amounts of water are added to activate the coupling agent.

While not deemed necessary to the practice of the invention, wetting and lubricating agents are considered useful to impart lubricity to the glass fibers for subsequent handling. Among those agents considered suitable are those commercially available materials such as vinylpyrrolidone polymers called Ganex polymers. Examples are Ganex V-816, V-516 and V-220.

The above components are preferably mixed and placed in solution by the addition of a solvent. Solvents that may be used for those in which all components are soluble such as, for example, N-methylpyrrolidinone (NMP), diacetone alcohol, methanol or a mixture of NMP and xylene.

Figure 1:
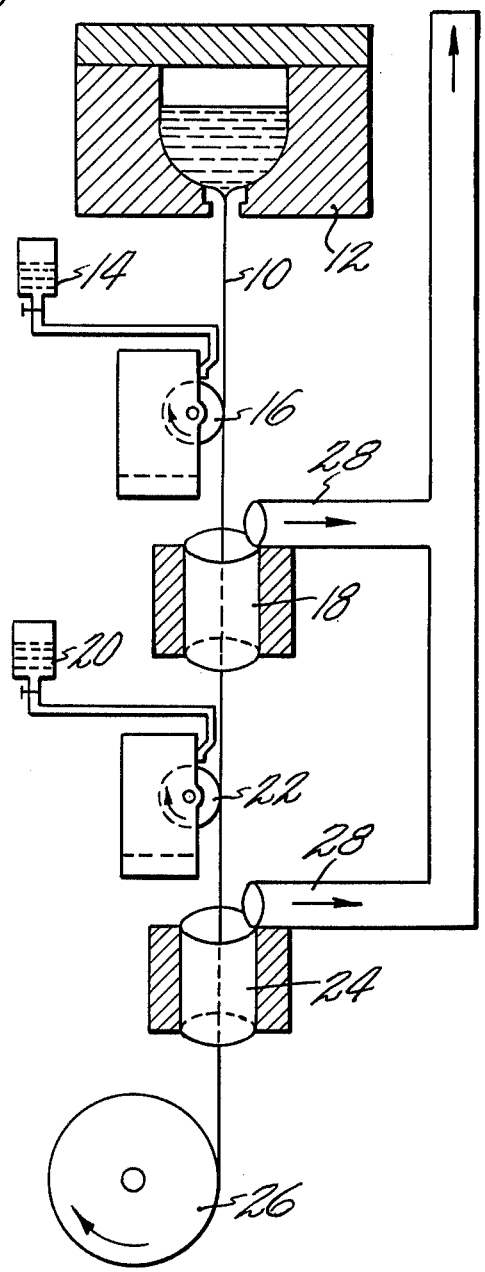
FIG. 1 is a schematic of apparatus useful in the forming, coating, drying and winding of glass fibers.

Referring now to FIG. 1, the procedure used to coat the fibers will be described. As a freshly fiberized glass fiber 10 emerges from conventional bushing 12, it is coated by a continuous stream of coating solution 14 via rotating pulley-type applicator 16. After coating, the fiber passes through a furnace 18 which heats the fiber to a temperature sufficiently high to evaporate the solvent from the coating and, if necessary, to polymerize the resin component. A second coating of coating solution 20, which may or may not be the same as the first coating solution 14, is applied via pulley-type applicator 22. The coated fiber is then passed through a second furnace 24 which evaporates the solvent from the coating and, again if necessary polymerizes the resin component and is wound up onto a take-up reel 26. Located adjacent to each furnace 18 and 24 is an exhaust duct 28 for removing volatiles. As will be appreciated, the fiber is coated tangential to the rotating pulley to minimize abrasion and to encapsulate the fiber completely with the coating solution 14.

In one series of experiments, S-glass was fiberized into monofilaments of approximately 10-12 μ diameter and coated immediately as it emerged, at a rate of 55.4 ft/sec. from the bushing. The furnaces utilized were 3-inch diameter by 6-inch long drying furnaces of the clam-shell type heated to 250°-600° C. After coating, monofilaments were wound onto a 12-inch diameter drum over a 1/16 inch width into a 2030 filament roving. In a bushing containing 204 holes, the multifilaments emerged from the bushing and were coated as they converged into a cone-like bundle or strand (end) by means of a conventional guide, then wound onto a 12-inch diameter drum. In these cases, the strand wound packages or cake packs were oven cured at 270° F for 12 hours. The strands were unwound from the cake pack to produce a 10-end or 20-end roving.

The invention is illustrated by the examples that follow.

EXAMPLE 1

In this example, S-glass monofilament was fiberized and treated as above-described. In particular, a polyimide film former available as Upjohn's 2080 polyimide having the formula

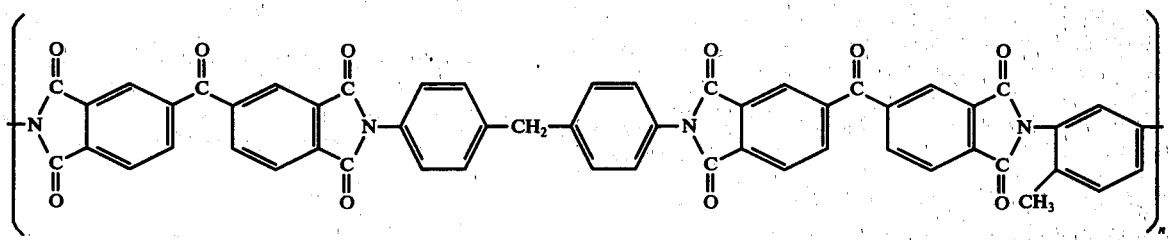

wherein n is an integer of sufficient magnitude, e.g., at least approximately 5, to provide a polymer with film forming capability, was formulated into a treating composition of:

|  | Wt (grams) | Wt % referring to total wt of a, b & c |
|---|---|---|
| a) Polyimide film former | 2.50 | 78.1 |
| b) Coupling agent (A-186) | 0.50 | 15.6 |
| c) Wetting/lubricating agent (Ganex V-516) | 0.20 | 6.3 |
| d) N-methylpyrrolidinone (NMP) | 86.50 |  |

A uniform continuous finish coating approximately 0.05-0.20 μ thick remained on the S-glass after passage through furnaces 18 and 24.

EXAMPLE 2

In this example, S-glass monofilament was fiberized and treated as in Example 1 except that the treating composition consisted essentially of:

|  | Wt (grams) | Wt % |
|---|---|---|
| a) Polyimide film former (Upjohn 2080) | 1.25 | 78.1 |
| b) Coupling agent (A-186) | 0.25 | 15.6 |
| c) Wetting/lubricating agent (Ganex V-816) | 0.10 | 6.3 |
| d) NMP | 98.4 | |

A uniform continuous finish coating approximately 0.05–0.20 μ thick remained on the S-glass after passage through furnaces 18 and 24.

EXAMPLE 3

S-glass monofilament was fiberized and treated as in Example 1 except that the treating composition, applied both by applicator 16 and applicator 22 consisted essentially of:

|  | Wt (grams) | Wt % |
|---|---|---|
| a) Polyimide film former (Upjohn 2080) | 0.62 | 63.9 |
| b) Coupling agent (A-186) | 0.25 | 25.8 |
| c) Wetting/lubricating agent (Ganex V-816) | 0.10 | 10.3 |
| d) NMP | 99.00 | |

A uniform continuous finish coating approximately 0.05–0.20 μ thick remained on the S-glass after passage through furnaces 18 and 24.

EXAMPLE 4

S-glass monofilament was fiberized and treated as in Example 1 except that the first treating composition, applied by applicator 16 consisted essentially of:

|  | Wt (grams) |
|---|---|
| Coupling agent (A-187) | 0.25 |
| Water | 0.07 |
| Diacetone alcohol | 100.0 | and the second treating composition, applied by applicator 22 consisted essentially of the treating composition of Example 2 for a combined treating composition of:

|  | Wt (grams) | Wt % |
|---|---|---|
| a) Polyimide film former (Upjohn 2080) | 1.25 | 67.6 |
| b) Coupling agent (A-186 + A-187) | 0.50 | 27.0 |
| c) Wetting/lubricating agent (V-816) | 0.10 | 5.4 |
| d) Water | 0.07 | |
| e) NMP | 98.4 | |
| f) Diacetone alcohol | 100.0 | |

A uniform continuous finish coating approximately 0.05–0.20 μ thick remained on the S-glass after passage through furnaces 18 and 24.

EXAMPLE 5

S-glass monofilament was fiberized and treated as in Example 4 with the first treating composition consisting essentially of:

|  | Wt (grams) |
|---|---|
| Coupling agent (A-187) | 0.50 |
| Wetting/lubricating agent (V-816) | 0.10 |
| Water | 0.13 |
| Diacetone alcohol | 100.0 | and the second treating composition being that of Example 2 for a combined treating composition of:

|  | Wt (grams) | Wt % |
|---|---|---|
| a) Polyimide film former (Upjohn 2080) | 1.25 | 56.8 |
| b) Coupling agent (A-186 + A-187) | 0.75 | 34.1 |
| c) Wetting/lubricating agent (V-816) | 0.20 | 9.1 |
| d) Water | 0.13 | |
| e) NMP | 98.4 | |
| f) Diacetone alcohol | 100.0 | |

A uniform continuous finish coating approximately 0.05–0.20 μ thick remained on the S-glass after passage through furnaces 18 and 24.

EXAMPLE 6

S-glass monofilament was fiberized and treated as in Example 4 with the first treating composition consisting essentially of:

|  | Wt (grams) |
|---|---|
| Coupling agent (A-186) | 0.25 |
| Water | 0.07 |
| Diacetone alcohol | 100.00 | and the second treating composition being that of Example 2 for a combined treating composition of:

|  | Wt (grams) | Wt % |
|---|---|---|
| a) Polyimide film former (Upjohn 2080) | 1.25 | 67.6 |
| b) Coupling agent (A-186) | 0.50 | 27.0 |
| c) Wetting/lubricating agent (Ganex V-816) | 0.10 | 5.4 |
| d) Water | 0.07 | |
| e) NMP | 98.4 | |
| f) Diacetone alcohol | 100.00 | |

A uniform continuous finish coating approximately 0.05–0.20 μ thick remained on the S-glass after passage through furnaces 18 and 24.

EXAMPLE 7

S-glass monofilament was fiberized and treated as in Example 4 with the first treating composition consisting essentially of:

|  | Wt (grams) |
|---|---|
| Coupling agent (Y-5650) | 0.50 |
| Wetting/lubricating | 0.10 |

|   | Wt (grams) |
|---|---|
| agent (Ganex V-816) | |
| Water | 0.13 | and the second treating composition being that of Example 2 for a combined treating composition of:

|   | Wt (grams) | Wt % |
|---|---|---|
| a) Polyimide film former (Upjohn 2080) | 1.25 | 56.8 |
| b) Coupling agent (A-186 + Y-5650) | 0.75 | 34.1 |
| c) Wetting/lubricating agent (Ganex V-816) | 0.20 | 9.1 |
| d) Water | 0.13 | |
| e) NMP | 98.4 | |

A uniform continuous finish coating approximately 0.05–0.29 μ thick remained on the S-glass after passage through furnaces 18 and 24.

EXAMPLE 8

S-glass monofilament was fiberized and treated as in Example 4 with the first treating composition consisting essentially of:

|   | Wt (grams) |
|---|---|
| Coupling agent (Y-5650) | 0.50 |
| Wetting/lubricating agent (Ganex V-516) | 0.50 |
| Water | 0.13 | and the second treating composition being that of Example 2 for a combined treating composition of:

|   | Wt (grams) | Wt % |
|---|---|---|
| a) Polyimide film former (Upjohn 2080) | 1.25 | 48.1 |
| b) Coupling agent (A-186 + Y-5650) | 0.75 | 28.8 |
| c) Wetting/lubricating agent (Ganex V-816 + V-516) | 0.60 | 23.1 |
| d) Water | 0.13 | |
| e) NMP | 98.4 | |

A uniform continuous finish coating approximately 0.05–0.20 μ thick remained on the S-glass after passage through furnaces 18 and 24.

EXAMPLE 9

S-glass monofilament was fiberized and treated as in Example 4 with the first treating composition consisting essentially of:

|   | Wt (grams) |
|---|---|
| Coupling agent (A-187) | 0.50 |
| Wetting/lubricating agent (L-77) | 0.25 |
| Water | 0.14 |
| Diacetone alcohol | 99.30 | and the second treating composition being that of Example 2 for a combined treating composition of:

|   | Wt (grams) | Wt % |
|---|---|---|
| a) Polyimide film former (Upjohn 2080) | 1.25 | 53.2 |
| b) Coupling agent (A-186 + A-187) | 0.75 | 31.9 |
| c) Wetting/lubricating agent (V-816 + L-77) | 0.35 | 14.9 |
| d) Water | 0.14 | |
| e) NMP | 98.40 | |
| f) Diacetone alcohol | 99.30 | |

A uniform continuous finish coating approximately 0.05–0.20 μ thick remained on the S-glass after passage through furnaces 18 and 24.

EXAMPLE 10

S-glass monofilament was fiberized and treated as in Example 4 with the first treating composition consisting essentially of:

|   | Wt (grams) |
|---|---|
| Coupling agent (A-187) | 0.25 |
| Wetting/lubricating agent (A-1701) | 0.50 |
| Water | 0.07 |
| Diacetone alcohol | 100.00 | and the second treating composition being that of Example 2 for a combined treating composition of:

|   | Wt (grams) | Wt % |
|---|---|---|
| a) Polyimide film former (Upjohn 2080) | 1.25 | 53.2 |
| b) Coupling agent (A-186 + A-187) | 0.50 | 21.3 |
| c) Wetting/lubricating agent (V-816 + A-1701) | 0.60 | 25.5 |
| d) Water | 0.07 | |
| e) NMP | 98.40 | |
| f) Diacetone alcohol | 100.00 | |

A uniform continuous finish coating approximately 0.05–0.20 μ thick remained on the S-glass after passage through furnaces 18 and 24.

EXAMPLE 11

S-glass monofilament was fiberized and treated as in Example 4 with the first treating composition consisting essentially of:

|   | Wt (grams) |
|---|---|
| Coupling agent (A-187) | 0.25 |
| Wetting/lubricating agent (V-516) | 0.10 |
| Water | 0.07 |
| Diacetone alcohol | 99.60 | and the second treating composition being that of Example 3 for a combined treating composition of:

|   | Wt (grams) | Wt % |
|---|---|---|
| a) Polyimide film former (Upjohn 2080) | 0.62 | 46.9 |
| b) Coupling agent (A-186 + A-187) | 0.50 | 37.9 |
| c) Wetting/lubricating agent (V-516 + V-816) | 0.20 | 15.2 |

-continued

| | Wt (grams) | Wt % |
|---|---|---|
| d) Water | 0.07 | |
| e) NMP | 99.00 | |
| f) Diacetone alcohol | 99.60 | |

A uniform continuous finish coating approximately 0.05–0.20 μ thick remained on the S-glass after passage through furnaces 18 and 24.

EXAMPLE 12

S-glass monofilament was fiberized and treated as in Example 11 except that the second treating composition consisted essentially of that of Example 1. Thus the combined treating composition consisted essentially of:

| | Wt (grams) | Wt % |
|---|---|---|
| a) Polyimide film former (Upjohn 2080) | 2.50 | 75.8 |
| b) Coupling agent (A-186 + A-187) | 0.50 | 15.1 |
| c) Wetting/lubricating agent (V-516) | 0.30 | 9.1 |
| d) Water | 0.07 | |
| e) NMP | 86.50 | |
| f) Diacetone alcohol | 99.60 | |

A uniform continuous finish coating approximately 0.05–0.20 μ thick remained on the S-glass after passage through furnaces 18 and 24.

EXAMPLE 13

In this example, S-glass monofilament was fiberized and treated as in Example 1 except that the treating composition consisted essentially of:

| | Wt (grams) | Wt % |
|---|---|---|
| a) Polyimide film former (Upjohn 2080) | 2.50 | 87.7 |
| b) Coupling agent (A-187) | 0.25 | 8.8 |
| c) Wetting/lubricating agent (V-816) | 0.10 | 3.5 |
| d) NMP | 97.25 | |

A uniform continuous finish coating approximately 0.05–0.20 μ thick remained on the S-glass after passage through furnaces 18 and 24.

EXAMPLE 14

In this example, S-glass monofilament was fiberized and treated as in Example 1 except that the treating composition consisted essentially of:

| | Wt (grams) | Wt % |
|---|---|---|
| a) Polyimide film former (Upjohn 2080) | 1.25 | 78.1 |
| b) Coupling agent (A-187) | 0.25 | 15.6 |
| c) Wetting/lubricating agent (V-816) | 0.10 | 6.3 |
| d) NMP | 98.5 | |

A uniform continuous finish coating approximately 0.05–0.20 μ thick remained on the S-glass after passage through furnaces 18 and 24.

EXAMPLE 15

In this example, S-glass monofilament was fiberized and treated as in Example 1 except that the treating composition consisted essentially of:

| | Wt (grams) | Wt % |
|---|---|---|
| a) Polyimide film former (Upjohn 2080) | 1.00 | 74.1 |
| b) Coupling agent (A-187) | 0.25 | 18.5 |
| c) Wetting/lubricating agent (V-816) | 0.10 | 7.4 |
| d) NMP | 98.75 | |

A uniform continuous finish coating approximately 0.05–0.20 μ thick remained on the S-glass after passage through furnaces 18 and 24.

EXAMPLE 16

In this example, S-glass monofilament was fiberized and treated as in Example 1 except that the treating composition consisted essentially of:

| | Wt (grams) | Wt % |
|---|---|---|
| a) Polyimide film former (Upjohn 2080) | 5.00 | 93.4 |
| b) Coupling agent (A-187) | 0.25 | 4.7 |
| c) Wetting/lubricating agent (V-816) | 0.10 | 1.9 |
| d) NMP | 94.65 | |

A uniform continuous finish coating approximately 0.05–0.20 μ thick remained on the S-glass after passage through furnaces 18 and 24.

EXAMPLE 17

In this example, S-glass monofilament was fiberized and treated as in Example 1 except that the treating composition consisted essentially of:

| | | Wt (grams) | Wt % |
|---|---|---|---|
| a) | Polyimide film former (Upjohn 2080) | 1.00 | 57.2 |
| b) | Coupling agent (A-187) | 0.50 | 28.6 |
| c) | Wetting/lubricating agent (V-516) | 0.25 | 14.2 |
| d) | NMP | 9-.5 | |

A uniform continuous finish coating approximately 0.05–0.20 μ thick remained on the S-glass after passage through furnaces 18 and 24.

EXAMPLE 18

S-glass monofilament was fiberized and treated as in Example 4 with the first treating composition being that of Example 14 and the second treating composition being that of Example 3 for a combined treating composition of:

| | | Wt (grams) | Wt % |
|---|---|---|---|
| a) | Polyimide film former (Upjohn 2080) | 1.87 | 72.8 |
| b) | Coupling agent (A-186 + A-187) | 0.50 | 19.4 |
| c) | Wetting/lubricating agent (V-816) | 0.20 | 7.8 |
| d) | NMP | 197.5 | |

A uniform continuous finish coating approximately 0.05-0.20 μ thick remained on the S-glass after passage through furnaces 18 and 24.

EXAMPLE 19

S-glass monofilament was fiberized and treated as in Example 4 with the first treating composition being that of Example 3 and a polyimide film former derived from polymerization of monomers on the fiber surface labeled as 100P13, having the formula

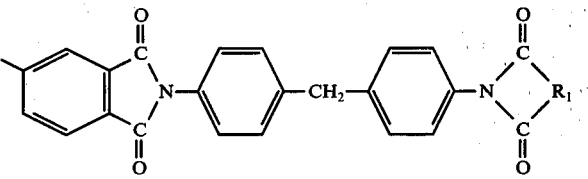

where $R_1$ is an unsaturated divalent system such as

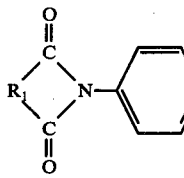 , 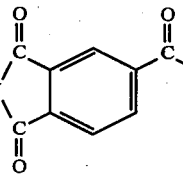 or 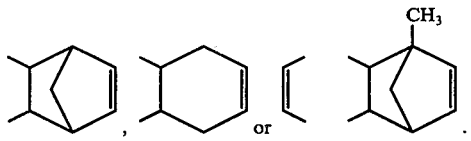

The combined treating composition consisted essentially of:

| | | Wt (grams) | Wt % |
|---|---|---|---|
| a) | Polyimide film former (100P13 + 2080) | 3.58 | 91.2 |
| b) | Coupling agent (A-186) | .25 | 6.3 |
| c) | Wetting/lubricating agent (V-816) | 0.10 | 2.5 |
| d) | NMP | 99.00 | |
| e) | Diacetone alcohol | 97.0 | |

A uniform continuous finish coating approximately 0.05-0.20 μ thick remained on the S-glass after passage through furnaces 18 and 24.

EXAMPLE 20

In this example, S-glass monofilament was fiberized and treated as in Example 1 except that Nolimide 605 from Rhone-Poulenc was used. Nolimide 605 is an hydroxylated aromatic polyimide having the repeating unit

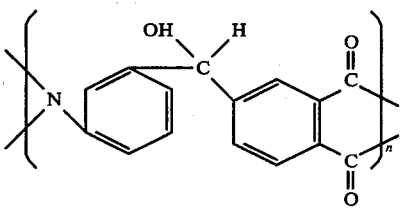

wherein n is an integer of sufficient magnitude, e.g., at least approximately 5, to provide a polymer with film forming capability, which was formulated into a treating composition of:

| | | Wt (grams) | Wt % |
|---|---|---|---|
| a) | Polyimide film former | 5.00 | 89.3 |

| | | Wt (grams) | Wt % |
|---|---|---|---|
| | (Nolimide 605-60 w/o in NMP/methanol-4:1) | | |
| b) | Coupling agent (A-186) | 0.50 | 8.9 |
| c) | Wetting/lubricating agent (V-816) | 0.10 | 1.8 |
| d) | Diacetone alcohol | 20.0 | |
| e) | NMP | 75.0 | |

A uniform continuous finish coating approximately 0.05-0.20 μ thick remained on the S-glass after passage through furnaces 18 and 24.

Two types of strength tests were used to evaluate the ability of the inventive coatings to protect the monofilament from the degradative effects of moisture: (1) tensile strength of rovings before and after moisture exposures, and (2) short beam shear strength of unidirectional glass fiber/resin composites before and after moisture. Table I below shows the tensile strength of 2030 filament rovings exposed to boiling water vapors and 95 percent relative humidity (RH) at 120° F for 8 weeks, with comparisons with uncoated fibers and commercial fibers. The superiority of the novel finishes compared to the unfinished glass and commercial glass is readily apparent.

Table I
TENSILE STRENGTH OF GLASS FIBERS COATED WITH MOISTURE RESISTANT FINISHES

| Example | Tensile Strength | | |
|---|---|---|---|
| | Dry[1] $10^3$ psi | Wet[2] $10^3$ psi | HC[3] $10^3$ psi |
| 1 | 257 | 288 | 325 |
| 2 | 367 | 385 | 334 |
| 3 | 330 | 345 | 328 |
| 4 | 315 | 334 | 294 |
| 5 | 300 | 311 | 345 |
| 6 | 296 | 291 | 355 |
| 7 | 408 | 373 | 443 |
| 8 | 357 | 343 | 367 |
| 9 | 300 | 343 | 304 |
| 10 | 367 | 363 | 395 |
| 11 | 242 | 241 | 306 |
| 12 | 327 | 350 | 367 |
| Unfinished S-glass (2030 filament) | 390 | 142 | 254 |
| Ferro 961 S-glass with commercial S-24 finish (multifilament 20 end) | 340 | 183 | 276 |
| " | 350 | 222 | 216 |
| " | | 193 | 235 |
| Owens-Corning 901 S-glass with commercial HTS finish (multifilament 12 end) | 408 | 288 | 334 |
| " | 410 | 214 | 348 |
| " | | | 404 |

[1]Dry-tested at room temperature (RT) 2 to 3 weeks after fabrication.
[2]Wet-tested at RT after 24 hours boiling water vapor exposure.
[3]HC-tested at RT after exposure to 95% RH at 120° F for 8 weeks.

Various of the glass filaments described in the examples above were fabricated as reinforcements in resin matrix composites. As the finished glass fiber was wound onto a 12-inch diameter drum over a 1½ inch width, a 50 weight percent solution of resin in acetone was applied by a brush-type applicator. After approximately 340,000 feet of the fiber was wound up, composites were cut to sizes of either 1 or 1½ inches wide by 2¼ inches long by approximately 0.10 inch thick.

Table II lists short beam shear strength of laminates made from the coated fibers and the noted epoxy resins.

Additional composites were made utilizing Owens-Corning S-glass which had been treated with HTS and also Ferro S-glass which has been treated with S-24. Both of these commercially finished glasses were impregnated with 100P13 matrix as above. For the Ferro S-glass composite, an 18-ply composite (No. 225) simi- Table II SHORT BEAM SHEAR STRENGTH OF UNIDIRECTIONAL
FIBER GLASS/RESIN COMPOSITES
MADE FROM FRESHLY
FIBERIZED S-GLASS CONTAINING MOISTURE RESISTANT FINISHES

| Composite from Ex. No. | Resin | Density g/cc | Fiber Vol % | Void Vol % | Short Beam Shear Strength, psi[4] | | |
|---|---|---|---|---|---|---|---|
| | | | | | Dry | Wet[6] | HC[7] |
| 3 | ERL 2256/0820[1] | 2.00 | 61.4 | 0 | 14,450 | 12,250 | 12,760 |
| 3 | " | 2.01 | 61.0 | 0 | 14,100 | 11,250 | 11,400 |
| 2 | " | 2.06 | 60.7 | 1.95 | 13,280 | 10,930 | 10,050 |
| 18 | ERX-67/MDA[2] | 2.26 | 69.8 | 0 | 13,225 | 11,350 | 12,015 |
| 3 | " | 2.15 | 63.9 | 6.6 | 10,385 | 10,215 | 9,860 |
| 1 | " | 2.14 | 56.5 | 1.59 | 12,600 | 10,900 | 9,862 |
| 19 | 100P13 | 2.07 | 65.7 | 0.83 | 14,725 | 14,365 | 12,685 |
| Commercial Ferro S-glass with S-24 Finish | ERX-67/MDA[2] | 2.18 | 61.9 | 1.7 | 12,000 | 9,510 | 10,900 |
| " | ERL 2256/0820[1] | 1.90 | 54.0 | 0.43 | 12,800 | 9,740 | 9,550 |
| " | " | 1.92 | 53.0 | 0.0 | 14,200 | 11,350 | 12,100 |
| " | " | 1.88 | 52.4 | 0.38 | 13,300 | 10.885 | 10,880 |
| Owens-Corning S-glass with HTS Finish | " | 1.85 | 50.0 | 0.85 | 12,900 | 11,200 | 11,650 |
| " | " | 1.96 | 58.0 | 0.55 | 13,385 | 11,570 | 11,800 |

[1]ERL-2256/ZZ1-0820 from Union Carbide Co. is a cycloaliphatic/bisphenol A blend epoxy cured with aromatic amine.
[2]ERX-67/MDA from Shell Chemical Co. is a brominated diglycidylaniline (epoxy) cured with 4,4'-methylenedianiline.
[3]100P13 is from NE/MDA/BTDE monomers from Aldrich Chemical Co. polymerized on a glass surface to a polyimide in the mol ratio 1:1:0.5.
[4]Short beam shear strength, span-to-depth ratio, 5/1.
[5]Dry - tested at RT 2 to 3 weeks after fabrication.
[6]Wet - tested at RT after 24 hours boiling water exposure.
[7]HC - tested at RT after exposure to 95% RH at 120° F for 8 weeks.

In another series of experiments, various composites were made and tested. Composite No. 226 was fabricated according to the following procedure. S-glass monofilament was made and treated with the formulation as described in Example 17 and a 2030 filament roving was produced. The roving was impregnated with 100P13 polyimide resin by immersed passage through 50 weight percent NE/MDA/BTDE monomers in methanol which upon polymerization gives 100P13. After impregnation, the roving was wound onto an 18-inch diameter drum which was lined with MYLAR film to form a prepreg tape 3½ inches wide. The tape was removed from the drum and cut into pieces by slitting perpendicular to the fiber direction to yield composite tapes 3½ inches wide by 8 inches long. The tapes were placed on a tray and heated for 30 minutes at 125° C, then for 30 minutes at 190° C. To make a multilayer composite, 18 plies of the tape were stacked in a mold, one over the other, with fiber rovings parallel. The mold was placed in a press, preheated to 300° C and when the temperature inside the mold reached 275° C, a pressure of 1,000 psi was applied, released momentarily and reapplied. The temperature of 300° C and pressure of 1,000 psi were maintained for 1 hour.

lar to the one above described was made using the same procedure. For the Owens-Corning S-glass composite, identical procedures and parameters were used except that a 12-ply composite (No. 227) was made.

The finished composites varied in thickness from 90 to 120 mils and were cut into flexural specimens for a four-point test at a span-to-depth ratio of 16/1 and short beam shear specimens for measurement at a span-to-depth ratio of 5/1. These specimens were thermally aged, weight changes determined and then subjected to various mechanical tests described below. The physical properties of the composites are listed in Table III.

Table III

PHYSICAL PROPERTIES OF UNIDIRECTIONAL
100P13 POLYIMIDE COMPOSITES

| Composite No. | Fiber Finish | Composition Volume Percent | | | Density g/cc |
|---|---|---|---|---|---|
| | | Fiber | Resin | Void | |
| 225 | S-24 | 73.5 | 24.5 | 2.0 | 2.25 |
| 227 | HTS | 73.5 | 25.0 | 2.0 | 2.27 |
| 226 | Ex. 17 | 66.4 | 33.2 | 0.5 | 2.06 |

The mechanical properties of the composites at room temperature, dry and after exposure to moist environments, are listed in Table IV.

Table IV

ROOM TEMPERATURES SHEAR AND FLEXURAL STRENGTH
OF UNIDIRECTIONAL S-GLASS/POLYIMIDE COMPOSITES

| Composite No. | Short Beam Shear Strength, psi | | | Flexural Properties | | | | | |
|---|---|---|---|---|---|---|---|---|---|
| | | | | Strength, $10^3$ psi | | | Modulus, $10^6$ psi | | |
| | Dry[1] | Wet[2] | HC[3] | Dry | Wet | HC | Dry | Wet | HC |
| 225 | 7,600 | 6,180 | 6,465 | 52.0[4] | 90.3[4] | 74.5[4] | 9.03 | 8.7 | 9.18 |
| 227 | 7,100 | 5,545 | 8,430 | 83.7[4] | 75.9[4] | 77.3[4] | 9.95 | 9.0 | 9.45 |

Table IV-continued
ROOM TEMPERATURES SHEAR AND FLEXURAL STRENGTH OF UNIDIRECTIONAL S-GLASS/POLYIMIDE COMPOSITES

| Composite No. | Short Beam Shear Strength, psi | | | Flexural Properties | | | | | |
|---|---|---|---|---|---|---|---|---|---|
| | | | | Strength, $10^3$ psi | | | Modulus, $10^6$ psi | | |
| | Dry[1] | Wet[2] | HC[3] | Dry | Wet | HC | Dry | Wet | HC |
| 226 | 12,800 | 5,645 | 6,675 | 198.0[4] | 81.4[4] | 69.0[4] | 12.8 | 8.12 | 8.75 |

[1] Tested within four weeks after composite was fabricated.
[2] Tested after exposure to 24-hour water boil.
[3] Tested after exposure to 95% RH at 120° F for eight weeks.
[4] Shear failure.

As can be seen, the Example 17 finish on the glass rovings of Composite 226 improved the dry shear and flexural strength relative to the other composites.

The elevated temperature (600° F) strength properties of the composites, dry and after exposure to the moist environments, are listed in Table V.

Table V
HIGH TEMPERATURE STRENGTH OF UNIDIRECTIONAL S-GLASS/POLYIMIDE COMPOSITES AFTER ENVIRONMENTAL AGING

| Composite No. | Short Beam Shear Strength, 600° F psi | | | Flexural Properties, 600° F | | | | | |
|---|---|---|---|---|---|---|---|---|---|
| | | | | Strength, $10^3$ psi | | | Modulus, $10^6$ psi | | |
| | Dry[1] | Wet[2] | HC[3] | Dry[1] | Wet[2] | HC[3] | Dry[1] | Wet[2] | HC[3] |
| 225 | 2,690 | 3,380 | 2,755 | 37.5[4] | 46.4[4] | 45.8[4] | 9.10 | 9.20 | 9.73 |
| 227 | 3,890 | 4,350 | 3,645 | 51.0[4] | 44.0[4] | 47.1[4] | 11.2 | 11.0 | 9.9 |
| 226 | 7,175 | 5,300 | 4,695 | 88.5[4] | 64.2[4] | 62.5[4] | 9.8 | — | 9.4 |

[1] Tested within four weeks after composite was fabricated.
[2] Tested after exposure to 24-hour water boil.
[3] Tested after exposure to 95% RH at 120° F for eight weeks.
[4] Shear failure.

As will be noted, Composite 226 exhibits superior shear and flexural strength in the dry condition. In addition, Composite 226 exhibits significantly superior strength retention after 24 hour water boil and 95 percent relative humidity exposures. It is significant that Composite 226 contains less fiber reinforcement than Composites 225 and 227 since this should have led to decreased initial flexural strength rather than increased structural strength. This indicates that load transfer via the interface between resin and fiber reinforcement is more efficient in this composite system than in the composites containing the greater amount of fiber reinforcement.

Composite specimens were exposed to flowing air (100 cc/min) for several hundred hours under isothermal conditions (550° F). Some of the composites were removed after 264 hours, others after 668 hours and the remainder after 1,004 hours.

Figure 2:
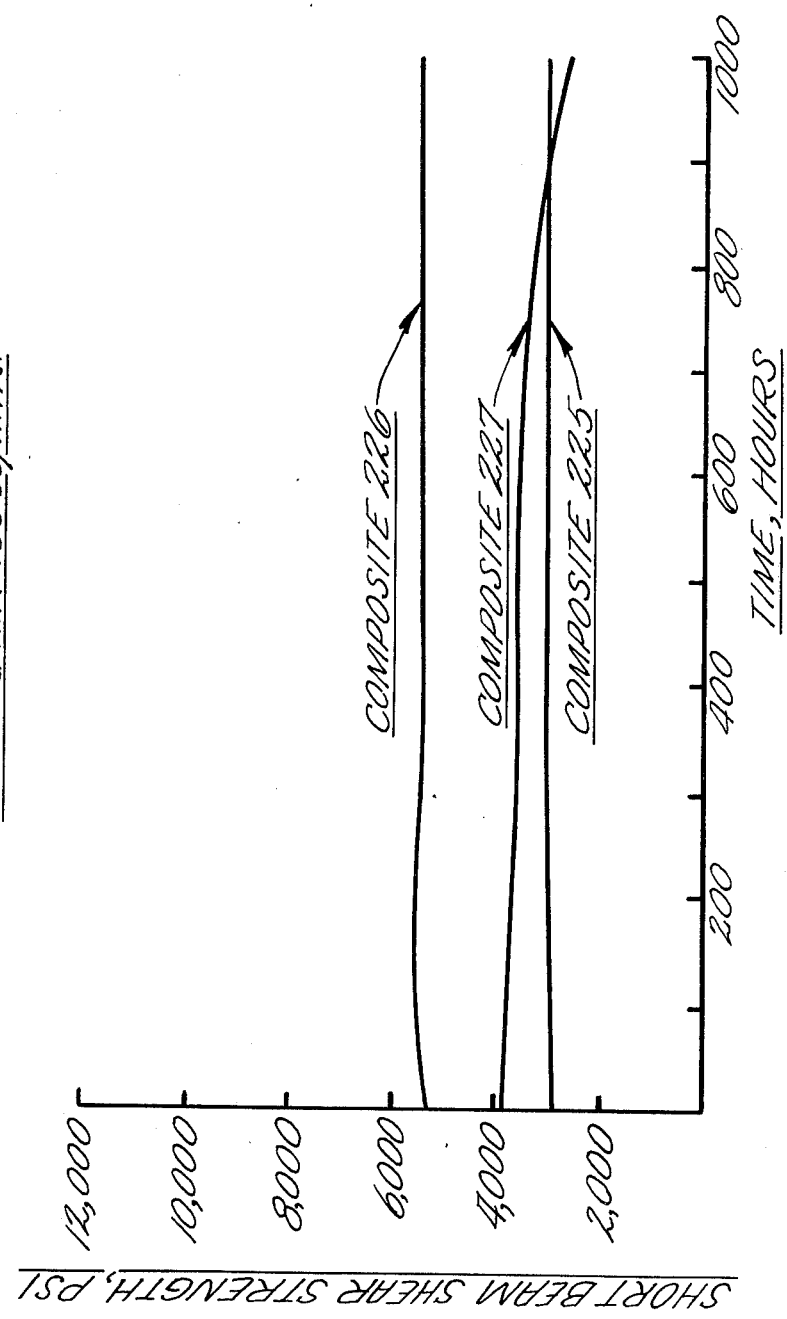
FIG. 2 is a graph illustrating 600° F short beam shear strength of composites after 500° F thermal aging.
Figure 3:
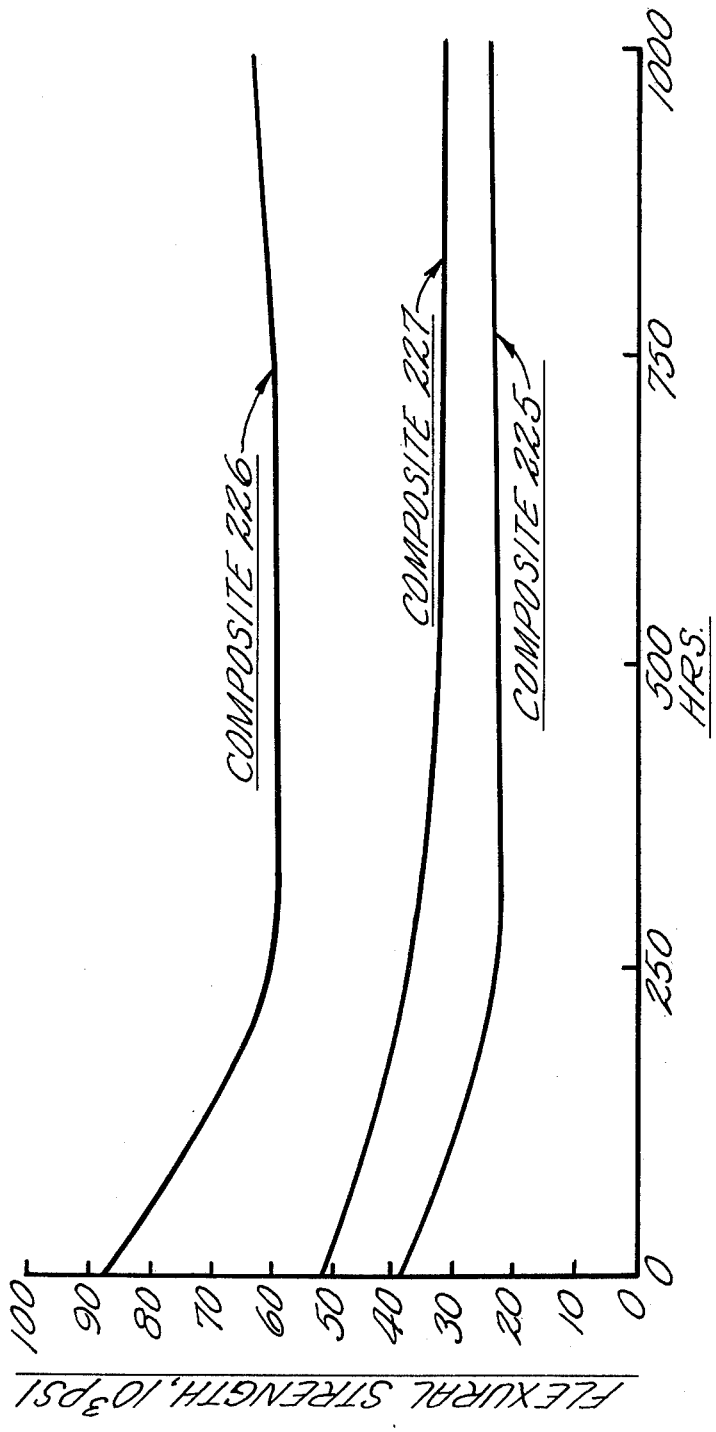
FIG. 3 is a graph illustrating 600° F flexural strength of composites after 500° F thermal aging.
Figure 4:
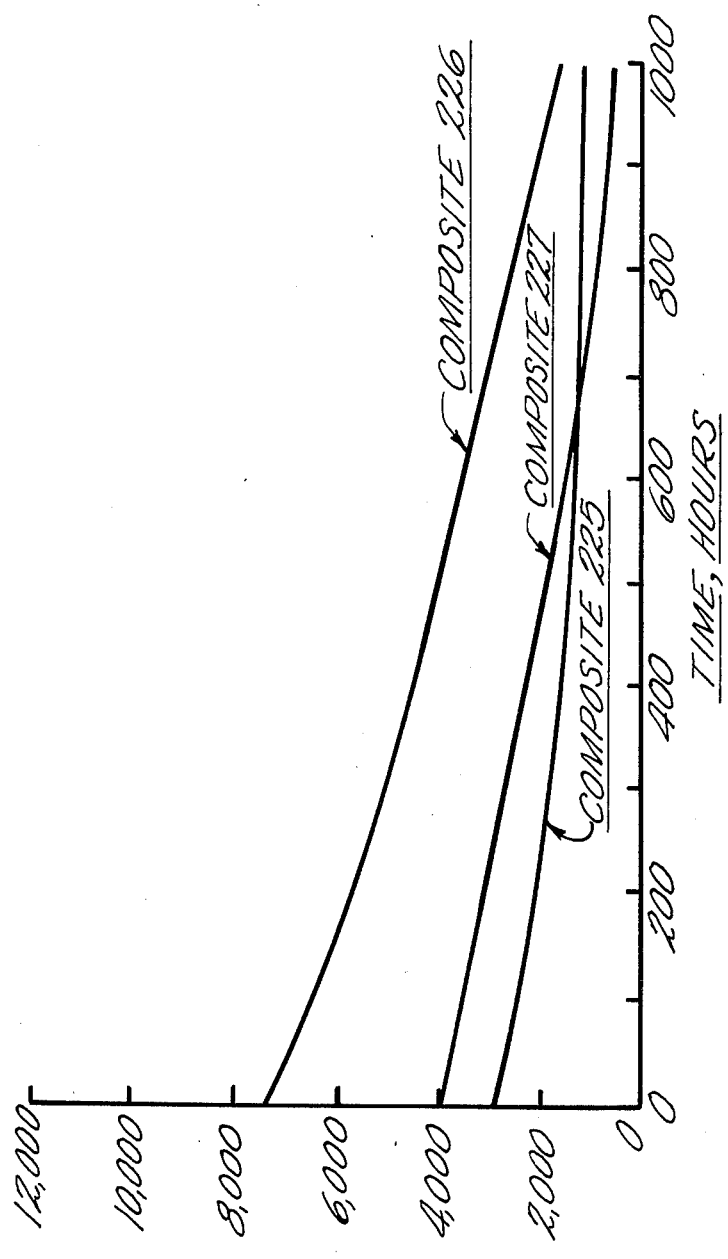
FIG. 4 is a graph illustrating 600° F short beam shear strength of composites after 600° F thermal aging.

Referring now to FIGS. 2 and 3, there is illustrated, respectively, 600° F short beam shear strength data after 500° F thermal aging and 600° F flexural strength data after 500° F thermal aging. Further tests were conducted wherein composite shear strength was measured after isothermal aging for 500 and 1,000 hours at 600° F. The results are shown in FIG. 4.

The inventive finish coating is applicable to other materials other than glass, as already discussed and as illustrated in the following example.

EXAMPLE 21

Commercially available Modmor-IIS graphite yarn was heat treated in a pure nitrogen atmosphere at 900° C for 4 seconds and immediately coated with NE/M-DA/BTDE monomer solution by immersed passage therethrough and wound onto a take-up drum. The wound yarn was cut into tape 1½ inches by 4 inches and was heated to 122° F for 2 hours in a mold and then imidized at 400° F for 3 hours. The mold was then inserted into a 600° F preheated press. Contact pressure was applied for 20 minutes until advanced polymerization occurred and then 800 psi was applied. The composite was allowed to reach 600° F and then held at 800 psi and 600° F for 1 hour. The composite was then cooled slowly to room temperature and tested. Room temperature shear strength was as high as 16,900 psi, indicating strong adhesion between the resin and the fiber, initial 600° F interlaminar shear was 9,180 psi and there was no tensile strength degradation of the yarn.

What has been set forth above is intended primarily as exemplary to enable those skilled in the art and the practice of the invention and it should therefore be understood that, within the scope of the appended claims, the invention may be practiced in other ways than as specifically described.

I claim:

1. A moisture and heat resistant finish coating on materials having a hydroxylated surface consisting essentially of approximately, by weight, 40–98 percent of a polyimide film former selected from the group consisting of (1) a fully imidized and polymerized polyimide containing the repeating unit

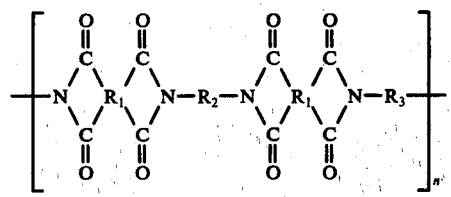

wherein $R_1$ is a tetravalent radical selected from the group consisting of

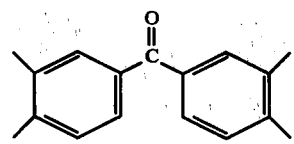

-continued

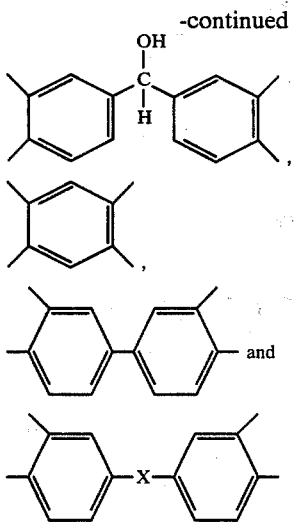

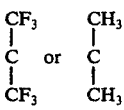

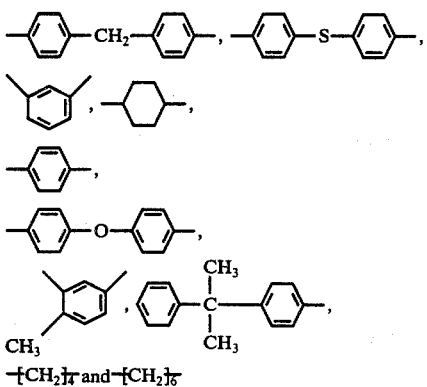

wherein X = O, S, SO₂, CH₂, $$\begin{array}{cc} CF_3 & CH_3 \\ | & | \\ C & \text{or} & C \\ | & | \\ CF_3 & CH_3 \end{array}$$

and R₂ is a divalent aromatic or aliphatic radical selected from the group consisting of

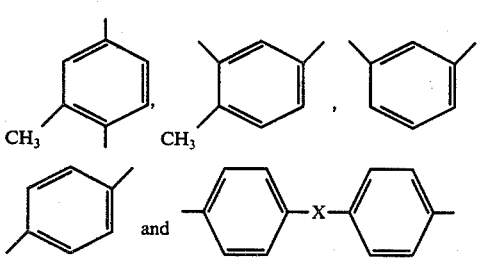

$-(CH_2)_{\overline{3}}$ and $-(CH_2)_{\overline{6}}$ and R₃ is an aromatic divalent radical selected from the group consisting of

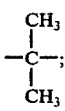

where X = CH₂, O, S or $$\begin{array}{c} CH_3 \\ | \\ -C- \\ | \\ CH_3 \end{array};$$

(2) an addition type resin intermediate derived from the low molecular weight polyimide monomer

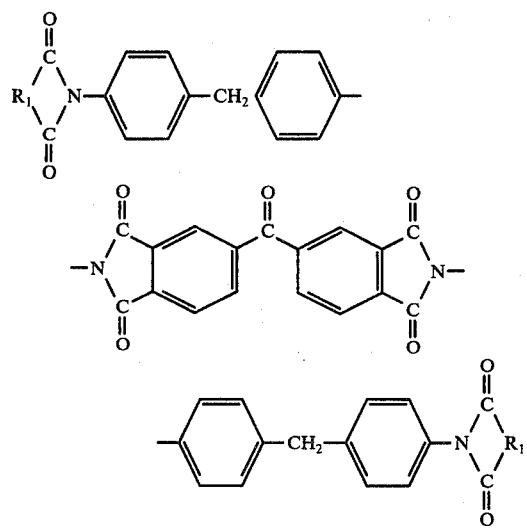

wherein R₁ is an unsaturated divalent system such as

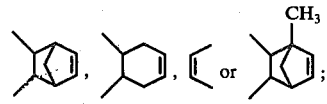

and (3) an hydroxylated aromatic polyimide in the amic acid stage having the repeating unit

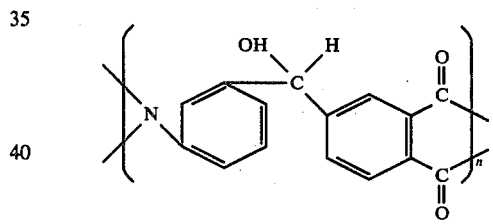

wherein n is an integer of sufficient magnitude, e.g., at least approximately 5, 2–60 percent of a silane coupling agent characterized by the formula

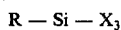

R — Si — X₃ wherein R is an organic group containing amino, epoxy, aminehydrochloride or carboxy functionality such as

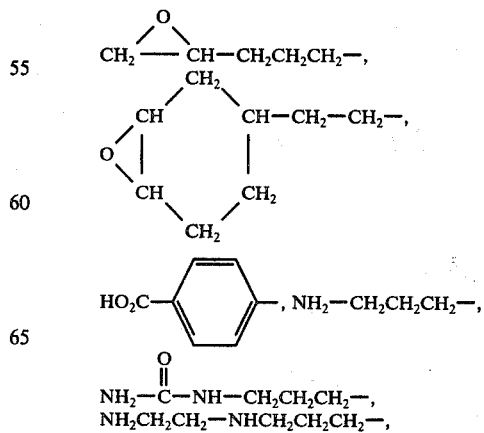

-continued

CH$_2$=CH—, HSCH$_2$CH$_2$CH$_2$—,

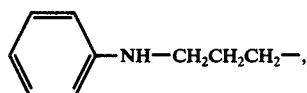

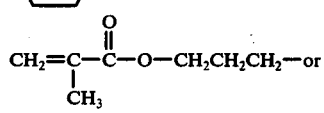

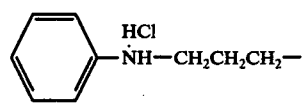

and X is an organic group which contains ether or ester functionality such as —OCH$_3$, —OCH$_2$CH$_3$,

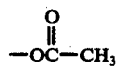

or —OCH$_2$CH$_2$OCH$_3$ and up to 30 percent of a wetting and lubricating agent, said finish coating having a thickness of approximately 0.02–25 microns.

2. In a composite comprising a resin matrix reinforced with glass fibers embedded therein, the improvement which comprises a moisture and heat resistant finish coating on the surface of said glass fibers bonded to said fibers and said resin consisting essentially of approximately, by weight, 40–98 percent of a polyimide film former selected from the group consisting of (1) a fully imidized and polymerized polyimide containing the repeating unit

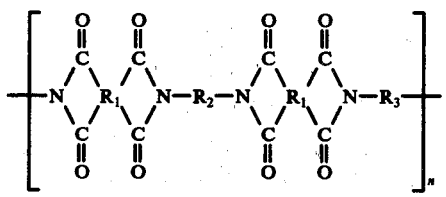

wherein R$_1$ is a tetravalent radical selected from the group consisting of

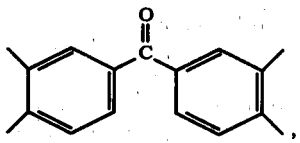

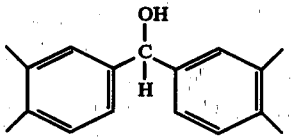

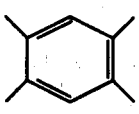

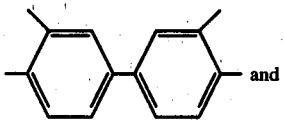

-continued

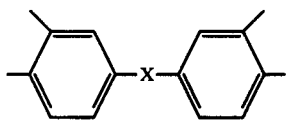

wherein X = O, S, SO$_2$, CH$_2$,

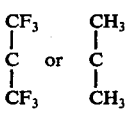

and R$_2$ is a divalent aromatic or aliphatic radical selected from the group consisting of

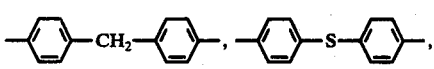

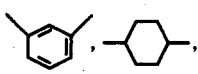

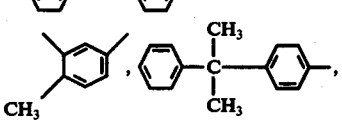

—(CH$_2$)$_4$—  —(CH$_2$)$_6$— and R$_3$ is an aromatic divalent radical selected from the group consisting of

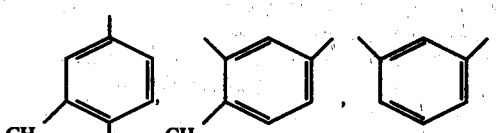

where X = CH$_2$, O, S or

(2) an addition type resin intermediate derived from the low molecular weight polyimide monomer

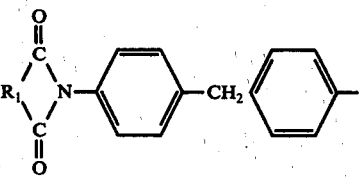

-continued

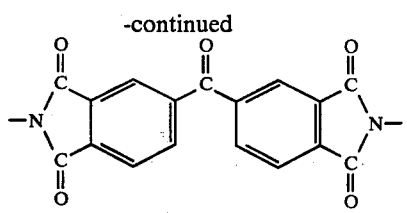

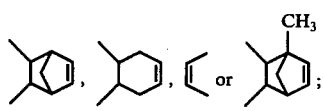

wherein R₁ is an unsaturated divalent system such as

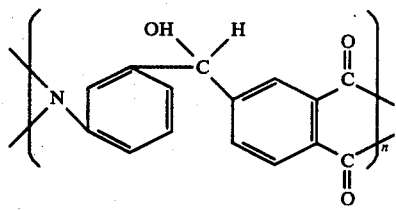

and (3) an hydroxylated aromatic polyimide in the amic acid stage having the repeating unit

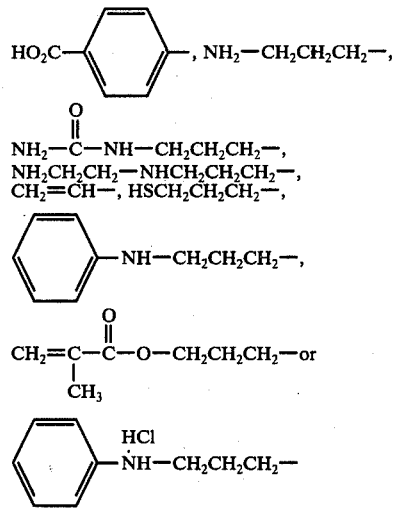

wherein n is an integer of sufficient magnitude, e.g., at least approximately 5, 2-60 percent of a silane coupling agent characterized by the formula $$R-Si-X_3$$

wherein R is an organic group containing amino, epoxy, aminehydrochloride or carboxy functionality such as

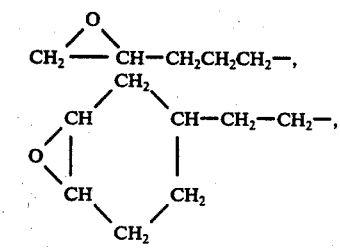

-continued $HO_2C$—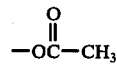—, $NH_2$—$CH_2CH_2CH_2$—, $$NH_2-\overset{O}{\underset{}{C}}-NH-CH_2CH_2CH_2-,$$
$NH_2CH_2CH_2$—$NHCH_2CH_2CH_2$—,
$CH_2$=$CH$—, $HSCH_2CH_2CH_2$—, ⟨phenyl⟩—NH—$CH_2CH_2CH_2$—, $$CH_2=\underset{CH_3}{\underset{|}{C}}-\overset{O}{\underset{}{C}}-O-CH_2CH_2CH_2-\text{ or}$$

⟨phenyl⟩—$\overset{HCl}{\underset{}{N}H}$—$CH_2CH_2CH_2$— and X is an organic group which contains ether or ester functionality such as —$OCH_3$, —$OCH_2CH_3$, $$-O\overset{O}{\underset{}{C}}-CH_3$$

or —$OCH_2CH_2OCH_3$ and up to 30 percent of a vinylpyrrolidone polymer wetting and lubricating agent, said coating having a thickness of approximately 0.02–25 microns.

3. The invention of claim 2 wherein said finish coating consists essentially of approximately, by weight, 60–90 percent of said polyimide film former, 10–30 percent of said silane coupling agent and 2–10 percent of said wetting and lubricating agent.

4. The invention of claim 3 wherein said coating has a thickness of 0.02–1.0 microns.

5. The invention of claim 2 wherein said polyimide film former has the formula

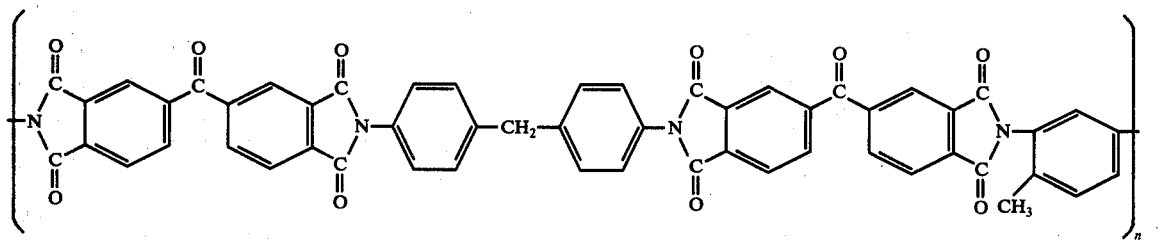

wherein n is an integer of sufficient magnitude, e.g., at least approximately 5, to provide a polymer with film forming ability.

6. The invention of claim 2 wherein said polyimide film former is derived from polymerization on the fiber surface of monomers having the formula

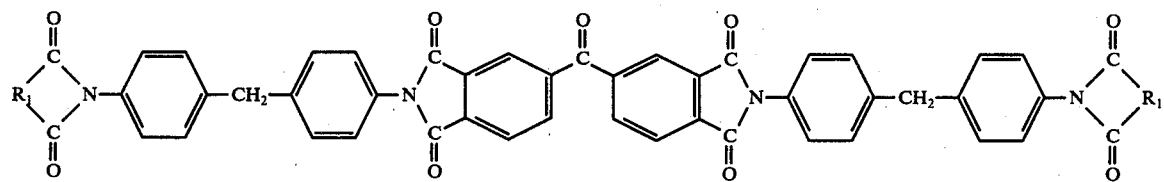
where R₁ is an unsaturated divalent system such as
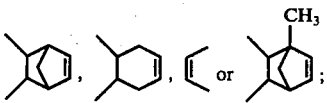
* * * * *

UNITED STATES PATENT OFFICE
CERTIFICATE OF CORRECTION

PATENT NO. : 4,056,651
DATED : November 1, 1977
INVENTOR(S) : Daniel A. Scola

It is certified that error appears in the above-identified patent and that said Letters Patent are hereby corrected as shown below:

Column 7, line 59    the word "for" should read -- are --

Column 11, line 21   "0.29" should read -- 0.20 --

Column 17, in Table II, under the heading   "Short Beam Shear Strength, $psi^4$"

"Dry" should read -- $Dry^5$ --

Column 17, Table II, in subnote 1, "ZZ1-0820" should read -- ZZL-0820 --

Column 18, Table III, in the heading before "100P13" should be inserted -- S-GLASS --

Signed and Sealed this

Fourth Day of April 1978

[SEAL]

Attest:

RUTH C. MASON
Attesting Officer

LUTRELLE F. PARKER
Acting Commissioner of Patents and Trademarks